Patented June 22, 1948

2,443,913

UNITED STATES PATENT OFFICE 2,443,913

SULFONATED CROTONALDEHYDE-ROSIN REACTION PRODUCT AND PROCESS FOR MAKING SAME

Ernest Paul Irany, Cranford, N. J., assignor to Shawinigan Chemicals Limited, Montreal, Quebec, Canada, a corporation of Canada No Drawing. Application November 8, 1945, Serial No. 627,517

6 Claims. (Cl. 260—98)

Introduction

This invention relates to new water-soluble condensation products.

Certain unsaturated aldehydes and ketones which contain the grouping C=C—C=O, for example, crotonaldehyde, acrolein, cinnamic aldehyde, vinyl methyl ketone, mesityl oxide, have the capacity of adding sulphurous acid to form saturated sulphonic acids. According to U. S. Patent 2,282,928, these sulphonated compounds can be condensed with compounds containing phenolic hydroxyl to yield water-soluble condensation products.

The invention

I have now found that sulphonated crotonaldehyde is able to react with unsaturated compounds containing the group

to yield water-soluble condensation products.

Examples are given below of preferred unsaturated materials belonging to this group or which under the conditions of reaction will produce such materials:

Isobutylene, tertiary-butyl alcohol, isoprene, 2-methyl pentadienes, methacrylic acid or its esters, mesityl oxide, diacetone alcohol, phorone, p-cymene, styrene, tetrahydronaphthalene, rosin, rosin oil, terpineol, geraniol, linalool, dicyclopentadiene, indene.

Procedure

One suitable method of preparing an aqueous solution of sulphonated crotonaldehyde suitable for use according to the invention is as follows. 100 parts by weight of crotonaldehyde and 250 parts water are saturated with sulphur dioxide under vigorous stirring at 50° to 70° C. In the early stages an exothermic reaction occurs and cooling is required. The mixture absorbs about 90 parts of sulphur dioxide and becomes homogeneous. More concentrated solutions of sulphonated crotonaldehyde are obtained by the same method as described, but using less water in proportion to crotonaldehyde. In many cases such stronger solutions are much more reactive.

Condensation of the sulphonated crotonaldehyde with the selected reactant according to the present invention occurs upon boiling an aqueous solution of the former together with the latter under reflux until the reaction mixture becomes a homogeneous aqueous solution or contains a water-soluble reaction product in satisfactory concentration. The free sulphonic acid acts as a catalyst. The aqueous solution may then be used as such or it may be neutralized and/or evaporated as preferred. Alkalis, alkaline earths, ammonia, organic bases, or other neutralization agents may be employed; caustic soda, and more particularly ammonia, are preferred.

Mechanism

The mechanism of the chemical reaction and the constitution of the reaction products are obscure. Chemical reaction evidently occurs since the reaction products are water-soluble, even in those cases where extremely hydrophobic, non-hydrolyzable hydrocarbons are used, or, as in the case of rosin, where a water-insoluble acidic material dissolves in a strongly acid aqueous liquor. These results are entirely unexpected since the specified unsaturated substances are not known to enter into chemical combination with aldehydes or ketones, neither are they known to react with sulphonic acids in boiling aqueous solutions. It is evident that condensation depends on a combination of the characters of aldehyde and of sulphonic acid in the same molecule.

Products

In view of the uncertain chemical nature of the products, the simpler chemical tests are not available for their determination. Reaction of the sulphonated crotonaldehyde with the reactants specified has evidently taken place if the properties of the aqueous phase are changed. The original sulphonated crotonaldehyde when neutralized to pH about 4 with caustic soda does not precipitate gelatine, its hide powder rating is negligible (nil to 8%) and its surface tension in 2% concentration is 71.7 dyn./cm. Reaction is therefore qualitatively or quantitatively indicated if one or more of the following conditions is fulfilled.

(a) Absorption into the aqueous phase, wholly or in part, of the originally water-insoluble component or components.

(b) Acquisition by the aqueous reaction liquor of the power, originally non-existent, to precipitate gelatine from an aqueous solution of 1% strength to which 10% sodium chloride has been added, the mixture of the liquor and reagent having a pH between 3 and 6.

(c) Acquisition by the aqueous reaction liquor of the capacity, originally non-existent, to be retained by hide powder to an extent indicating 15% or more "tannins," based on the solid water-soluble product, the test to be carried out under specifications adopted by the International Association of Leather Trades' Chemists. ("Leather Manufacturer" 1894, No. 9; Journal of the Society of Chemical Industry, 1894, p. 494.)

(d) A surface tension, in 2% solution, substantially lower than that of the 2% aqueous solution of the sulphonated crotonaldehyde used for the reaction.

Uses

The products made according to the invention are useful as tanning agents, surface-active agents, detergents, flotation agents, mordants, and for other similar purposes.

EXAMPLES

My invention is more fully illustrated by the following examples which, of course, are illustrative and not to be considered as limiting.

Example I

To the solution of sulphonated crotonaldehyde prepared according to the above directions were added 100 parts of 2-methyl pentadiene. These two immiscible liquids were vigorously stirred together, maintaining refluxing temperature for several hours, until a homogeneous aqueous solution was obtained. This solution was neutralized with aqueous caustic soda against methyl orange. The water-soluble condensation product precipitated the gelatine test solution, and gave a hide powder rating of 32%; the surface tension of its 2% solution was 44.4 dyn./cm.

Example II

To a solution of sulphonated crotonaldehyde as used in Example I were added 100 parts of crude coal tar distillates boiling between 160° and 180° C. and containing substantial quantities of coumarone and/or indene. After refluxing with stirring for 8 hours, 40 parts of the latter were absorbed into the aqueous phase. The aqueous solution, neutralized to pH about 4, precipitated gelatine, had a hide powder rating of 46.5% and, in 2% concentration, a surface tension of 45.2 dyn./cm.

Example III

A highly concentrated solution of sulphonated crotonaldehyde was prepared by saturating 100 parts crotonaldehyde and 100 parts water with sulphur dioxide at about 60° C., under vigorous stirring. To this solution were added 200 parts wood rosin and the mixture was heated under reflux for 6 hours while stirring. A viscous melt was obtained which solidified on cooling and formed a somewhat turbid solution in water. When neutralized to pH about 4 by aqueous ammonia, it formed a very effective tanning agent. It precipitated gelatine, had a hide powder rating of 50% and, in a 2% solution, a surface tension of 41.6 dyn./cm. It converted animal hide into a firm, strong, and highly filled leather.

I claim:

1. As a new product the water-soluble reaction product of sulphonated crotonaldehyde and a substance selected from the group consisting of rosin and rosin oil.

2. As a new product, the water-soluble reaction product of sulphonated crotonaldehyde and rosin oil.

3. As a new product, the water-soluble reaction product of sulphonated crotonaldehyde and rosin.

4. A process of preparing a water-soluble condensation product consisting of reacting an aqueous solution of sulphonated crotonaldehyde with a substance selected from the group consisting of rosin and rosin oil.

5. A process of preparing a water-soluble condensation product consisting of reacting an aqueous solution of sulphonated crotonaldehyde with rosin oil.

6. A process of preparing a water-soluble condensation product, consisting of reacting an aqueous solution of sulphonated crotonaldehyde with rosin.

ERNEST PAUL IRANY.

REFERENCES CITED

The following references are of record in the file of this patent:

UNITED STATES PATENTS

| Number | Name | Date |
|---|---|---|
| 1,823,752 | Michelson | Apr. 19, 1929 |
| 2,321,451 | Bauer | July 21, 1939 |

OTHER REFERENCES

Ser. No. 415,424, Hopff (A. P. C.) pub. Apr. 20, 1943.